United States Patent [19]

Sansone

[11] Patent Number: 4,814,400

[45] Date of Patent: Mar. 21, 1989

[54] POLYBENZIMIDAZOLE ESTER AND CARBOXYLIC ACID

[75] Inventor: Michael J. Sansone, Berkeley Heights, N.J.

[73] Assignee: Hoechst Celanese Corporation, Somerville, N.J.

[21] Appl. No.: 37,376

[22] Filed: Apr. 13, 1987

[51] Int. Cl.$^4$ .............................................. C08G 73/18
[52] U.S. Cl. .................................. 525/435; 525/419; 525/420
[58] Field of Search ........................ 525/435, 419, 420

[56] References Cited

U.S. PATENT DOCUMENTS 4,579,915  4/1986  Choe .................................. 525/435
4,666,996  5/1987  Sansone ............................. 525/435

Primary Examiner—Harold D. Anderson
Attorney, Agent, or Firm—Lynch, Cox Gilman & Mahan

[57] ABSTRACT

The invention discloses substituted polybenzimidazole esters produced by reacting a polybenzimidazole polymer with a halogenated ester. It also discloses substituted polybenzimidazole carboxylic acids produced by hydrolyzing the polybenzimidazole ester previously provided with a strong hydroxyl base. These substituted polybenzimidazole products may be formed into separatory media with greater use then conventional polybenzimidazole polymer articles such as to form ultrafilters. Further, the polybenzimidazole carboxylic acids may be useful as weak cation exchange resins.

48 Claims, No Drawings

POLYBENZIMIDAZOLE ESTER AND CARBOXYLIC ACID

BACKGROUND OF INVENTION

1. Field of Invention

This invention relates to substituted polybenzimidazole products. More particularly, the invention relates to polybenzimidazole esters and carboxylic acids and a process for their production.

2. Prior Art

Polybenzimidazoles are a well known class of polymers characterized by a high degree of thermal and chemical stability. As a result, polybenzimidazole polymers have found application in a wide variety of uses such as membranes, ultrafilters, reverse osmosis devices and other separatory media.

While polybenzimidazole polymers are generally more resistant to chemical attack than are other types of polymers, such as cellulose acetate polymers, reaction at the nitrogen/hydrogen bond on the imidazole ring under certain conditions will occur, thereby adversely affecting the performance of the polymer. One means of avoiding this reaction is to chemically modify the polybenzimidazole polymer, for example, by crosslinking the polymer as disclosed in U.S. Pat. Nos. 4,020,142 and 4,154,919.

Another method of reducing the reactivity of the polybenzimidazole polymer is by replacing the imidazole hydrogen with a less reactive substituent. Several patents have disclosed substituted polybenzimidazole polymers. For example, U.S. Pat. No. 4,377,546 discloses a substituted polybenzimidazole wherein the hydrogen on the imidazole ring is replaced by a phenyl group.

U.S. Pat. No. 4,579,915 discloses a substituted polybenzimidazole polymer wherein the imidazole hydrogen has been replaced by the following substituent:

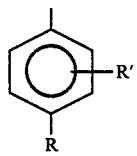

wherein R is nitro, cyano or trifluoromethyl, and R' is hydrogen, alkyl, nitro, cyano or trifluoromethyl.

U.S. Pat. No. 3,943,125 discloses a vast array of substituted polybenzimidazole polymers produced by (1) reacting substituted tetraamino pyridines, or their acid salts with a substantially molar quantity of a suitable acid halide or dianhydride to produce substituted precyclized intermediates and (2) cyclodehydrating and crosslinking these intermediates to produce the substituted polybenzimidazole polymers. However, this patent fails to disclose polybenzimidazole carboxylic acids or esters for a process for their production.

U.S. Pat. No. 3,518,234 discloses a process for the preparation of aryl substituted polybenzimidazole polymers by the cyclo-dehydration of aromatic polyamide imines, but again fails to disclose polybenzimidazole carboxylic acids or esters or a process for their production.

An hydroxyl-modified polybenzimidazole polymer prepared by reacting a polybenzimidazole polymer with an omega-halo-alkanol or a 1,2-alkylene oxide is disclosed in U.S. Pat. No. 3,578,644. A separate process for preparing hydroxyl-modified polybenzimidazole polymers is disclosed in U.S. Pat. No. 4,549,388.

Although various substituted polybenzimidazol polymers have been disclosed in the prior art, none disclose carboxylic acid or ester substituted polybenzimidazole polymers or a process for their production.

It is therefore an object of this invention to prepare novel polybenzimidazole esters.

A further object of this invention is to prepare novel polybenzimidazole carboxylic acids.

It is an additional object of this invention to disclose a process for the production of polybenzimidazole carboxylic acids and esters.

It is a still further object of this invention to disclose a process for the production of substituted polybenzimidazole articles which may be useful as separatory media.

These and other objects, as well as the scope, nature and utilization of this invention will be apparent to those skilled in the art from the following detailed description and appended claims.

SUMMARY OF INVENTION

In accordance with the present invention there is disclosed a process for the production of novel polybenzimidazole esters by the following steps:

(a) preparing a polybenzimidazole polymer solvent solution; and (b) reacting the polybenzimidazole polymer with an halogenated ester to form an N-substituted polybenzimidazole ester.

The present invention also discloses a process for the production of novel polybenzimidazole carboxylic acids by the following steps:

(a) preparing a polybenzimidazole polymer solvent solution;

(b) reacting the polybenzimidazole polymer with an halogenated ester to form an N-substituted polybenzimidazole ester; and (c) hydrolyzing the N-substituted polybenzimidazole ester in the presence of an hydroxyl base to form an N-substituted polybenzimidazole carboxylic acid.

The polybenzimidazole esters and carboxylic acids produced by the process of this invention can be useful as separatory devices. In particular, the polybenzimidazole carboxylic acid polymers may be formed into ion exchange resins which are particularly useful where the high temperature tolerance and chemical stability of the substituted polybenzimidazole polymer are particularly desirable.

DETAILED DESCRIPTION OF INVENTION

A. The Starting Polymer

Polybenzimidazole are a known class of heterocyclic polymers. Typical polymers of this class and their preparation are more fully described in U.S. Pat. No. 2,895,948, U.S. Pat. No. Re. 26,065, and in the Journal of Polymer Science, Vol. 50, pages 511-539 (1961) which are herein incorporated by reference. The polybenzimidazoles consist essentially of recurring units of the following Formula I and II. Formula I is:

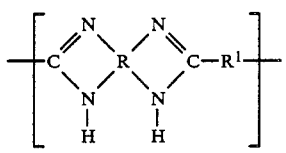

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and $R^1$ is a member of the class consisting of (1) an aromatic ring, (2) an alkylene group (preferably those having 4 to 8 carbon atoms), and (3) a heterocyclic ring from the class consisting of (a) pyridine, (b) pyrazine, (c) furan, (d) quinoline, (e) thiophene, and (f) pyran.

Formula II is:

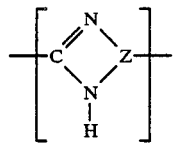

wherein Z is an aromatic nucleus having the nitrogen atoms forming the benzimidazole ring paired upon adjacent carbon atoms of the aromatic nucleus.

As set forth in U.S. Pat. No. Re. 26,065, aromatic polybenzimidazoles having the recurring units of Formula II may be prepared by self-condensing a trifunctional aromatic compound containing only a single set of ortho-disposed diamino substituents. Exemplary of polymers of this type is poly-2,5(6)-benzimidazole prepared by the autocondensation of phenyl-1,3,4-diaminobenzoate.

As set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxylic compound selected from the class consisting of (a) the diphenyl ester of an aromatic dicarboxylic acid, (b) the diphenyl ester of a heterocyclic dicarboxylic acid wherein the carboxyl groups are substituents upon a carbon in a ring compound selected from the class consisting of pyridine, pyrazine, furan, quinoline, thiophene and pyran; and (c) an anhydride of an aromatic dicarboxylic acid.

Examples of polybenzimidazole which have the recurring structure of Formula I are as follows:
poly-2,2'(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,6-(m-phenylene)-diimidazobenzene;
poly-2,2'-octamethylene-5,5'-bibenzimidazole;
poly-2,2'(m-phenylene)-5,5'-di(benzimidazole) ether;
poly-2,2'(m-phenylene)-5,5'-di(benzimidazole) sulfide;
poly-2,2'(m-phenylene)-5,5'-di(benzimidazole) sulfone;
poly-2,2'(m-phenylene)-5,5'-di(benzimidazole) methane;
poly-2',2'(m-phenylene)-5',5'-di(benzimidazole) propane-2,2;
and poly-2,2'-(m-phenylene)-5',5"-di(benzimidazole) ethylene-1,2 where the double bonds of the ethylene groups are intact in the final polymer.

The preferred polybenzimidazole for use in the present process is one prepared from poly-2,2'-(m-phenylene)-5,5'-bibenzimidazole, the recurring unit of which is:

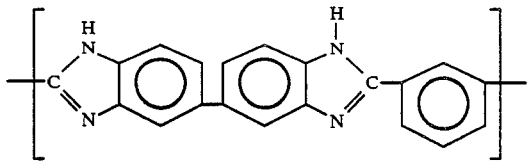

Any polymerization process known to those skilled in the art may be employed to prepare the polybenzimidazole which may then be formed into products of the instant invention. Representative techniques for preparing the polybenzimidazole are disclosed in U.S. Pat. Nos. 3,509,108, 3,549,603 and 3,551,389, which are assigned to the assignee of the present invention and are herein incorporated by reference.

With respect to aromatic polybenzimidazoles, preferably equimolar quantities of the monomeric tetraamine and dicarboxyl compound are introduced into a first stage melt polymerization reaction zone and heated therein at a temperature above about 200° C., preferably at least 250° C., and more preferably from about 270° C. to 300° C. The reaction is conducted in a substantially oxygen-free atmosphere, i.e., below about 20 ppm oxygen and preferably below about 8 ppm oxygen, until a foamed prepolymer is formed having an inherent viscosity, expressed as deciliters per gram, of at least 0.1 and preferably from about 0.13 to 0.3. The inherent viscosity (I.V.) as used herein is determined from a solution of 0.4 grams of the polymer in 100 ml. of 97 percent $H_2SO_4$ at 25° C.

After the conclusion of the first stage reaction, which normally takes at least 0.5 hour and preferably 1 to 3 hours, the foamed prepolymer is cooled and the powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.3, e.g., about 0.3 to 2.5.

The temperature employed in the second stage is at least 250° C., preferably at least 325° C., and more preferably from about 350' to 425° C. The second stage reaction generally takes at least 0.5 hour, and preferably from about 1 to 4 hours or more. It is, of course, also possible to prepare the instant polymers via a one-step reaction. However, the previously-described two-step process is preferred. The polybenzimidazole solution is allowed to cool to a temperature of about room temperature. Such temperature is not crucial to the process.

B. The Polymer Solution

The solvents utilized to form the polybenzimidazole polymer solution include those solvents which are commonly recognized of being capable of dissolving the particular polybenzimidazole polymer. For instance, the solvents may be selected from those commonly utilized in the formation of polybenzimidazole dry spinning solutions including N-N-dimethylacetamide, N-N-dimethylformamide, dimethylsulfoxide and N-methyl-2-pyrrolidone. While prior art polybenzimidazole solvent solutions have generally used N-N-dimethylacetamide, the preferred solvent for this reaction is N-methyl-2-pyrrolidone since it helps prevent the polybenzimidazole polymer from precipitating from solution or gelling during the reaction. Further, as will later be discussed, the reaction goes best at higher temperatures and by the use of N-methyl-2-pyrrolidone as the solvent, which has a higher boiling point than N-N-dimethylacetamide, a higher temperature of reaction can be utilized.

The polymer solution may be prepared, for example, by dissolving sufficient polybenzimidazole polymer into the solvent to yield a final solution containing from about 1 to about 30 percent by weight of the polymer based on the total weight of the solution. Although normal polybenzimidazole dopes contain at least about 15 percent by weight based on the total solution weight, of polybenzimidazole, it is surprisingly found that this process runs best when the percentage of polybenzimidazole ranges from about 5 to about 15 percent. When higher percentage polybenzimidazole dopes are used, they tend to gel upon the addition of the reactants. In a preferred embodiment, the concentration of the polybenzimidazole is from about 5 to about 10 percent by weight, based on the total weight of the solution.

One suitable means for dissolving the polymer in the solvent is by mixing the materials at a temperature above the normal boiling point of the solvent, for example, about 25° to about 120° C. above such boiling point, and at a pressure of about 2 to about 15 atmospheres for a period of about 1 to about 5 hours. The resulting solutions are preferably filtered to remove any undissolved polymer. A minor amount of lithium chloride (from about 0.5 to about 5 percent by weight based on the total solution weight) optionally may be added to prevent the polybenzimidazole polymer from phasing out of the solution upon standing for extended periods of time.

C. The Halogenated Ester Reaction

The polybenzimidazole polymer dissolved in solution can be converted to a polybenzimidazole ester by reacting the polybenzimidazole polymer with an halogenated alkyl ester. The reaction of the polybenzimidazole polymer with the halogenated alkyl ester, using the polybenzimidazole polymer of Formula I, produces a polybenzimidazole ester by the following reaction scheme:

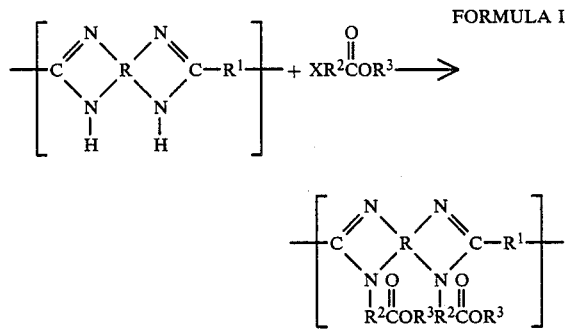

FORMULA I wherein R and $R^1$ are as previously defined; X is a halogen, such as chloro, bromo or iodo, with bromo the preferred halogen; $R^2$ is a $C_1$–$C_{20}$ alkyl group, with the preferred $R^2$ substituent being a $C_1$ to $C_6$ alkyl group and the most preferred $R^2$ substituent being a methyl group; and $R^3$ is a substituted or unsubstituted, monovalent $C_1$–$C_{20}$ alkyl, alkenyl or aryl group, which may be the same as or different from $R^2$.

When longer chain alkyl substituents are used as $R^2$ substituents, the temperature and reaction time must be increased and the percentage of substitution achieved may be reduced. While the choice of the $R^2$ substituent is important to the reaction process, the choice of the $R^3$ substituent generally does not affect the reaction process. The only requirements for the $R^3$ substituent are: (1) if the polybenzimidazole ester is to be converted into a polybenzimidazole carboxylic acid, the $R^3$ substituent must not prevent hydrolysis; and (2) the $R^3$ substituent must not render the polybenzimidazole polymer acidic, since this acidity will hinder the esterification reaction.

Examples of acceptable halogenated alkyl esters include methyl bromoacetate, ethyl bromoacetate, ethyl chloro formate, ethyl chloroacetate, methyl chloroacetate, propyl bromoacetate, ethyl chlorobutyrate, methyl bromo propionate, chloro-N-pentyl acetate, ethyl bromopropionate and the like. In a preferred embodiment the halogenated ester is a $C_1$–$C_6$ alkyl acetate such as methyl bromoacetate.

The halogenated ester chosen for this reaction can be employed essentially in any molar quantity with respect to the polybenzimidazole polymer depending on the percentage of substitution desired. When substitutions above about 10 percent are desired, the halogenated ester reactant must be employed in approximately a stoichiometric quantity with respect to the reactive imidazole hydrogen sites on the polybenzimidazole polymer. When quantities in excess of a stoichiometric quantity of the halogenated esters are used, no significant increase in the level of substitution is achieved and, if the excess is great, i.e., in excess of 5:1 halogenated ester to reactive nitrogen-hydrogen imidazole sites, it may interfere with the reaction. Accordingly, in a preferred embodiment, the ratio of the halogenated ester group to each reactive imidazole nitrogen-hydrogen site ranges from about 1 to 1 to about 2 to 1.

The time and temperature for the reaction may vary depending on the $R^2$ and $R^3$ substituents on the halogenated ester. When low molecular weight halogenated esters are used, i.e., less than about 200, such as methyl bromoacetate, they may be mixed directly with the polybenzimidazole solvent solution and then heated to a temperature between about 30° C. and about 180° C. for about 1 to 24 hours. In a preferred embodiment, the reaction with low molecular weight esters is run at a temperature between about 60° C. and about 120° C. for a period of about 5 to about 15 hours.

In contrast, when higher molecular weight halogenated esters are used, i.e., greater than about 200, the reaction must be run at a temperature above about 100° C. and for a period of about 15 to about 24 hours to achieve acceptable substitutions.

While the temperature of the reaction does not otherwise appear to be crucial in determining the percentage of substitution, the length of time of the reaction is important even with low molecular weight halogenated esters. When the reaction is run for as few as 4 hours, even with low molecular weight esters, the percentage of substitution is only about 10 percent. In contrast, when a reaction using low molecular weight esters is run for at least about 8 hours, substitutions in the range of 80 percent can be achieved.

Once the reaction has gone to completion, the reaction product is precipitated from the solution by adding a non-solvent for the polybenzimidazole ester. Typical non-solvent precipitating agents include water, acetone and other such common non-solvents, with acetone the preferred precipitating agent.

The polybenzimidazole ester produced by the reaction of the process has a general formula of:

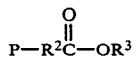

wherein P is the residuum of a polybenzimidazole polymer and $R^2$ and $R^3$ are as previously defined.

The polybenzimidazole ester prepared by this reaction can be used to form membranes, ultrafilters or other separatory media by well known processes. However, in a preferred embodiment, the polybenzimidazole ester is hydrolyzed to form a polybenzimidazole carboxylic acid as discussed in the succeeding section.

D. Preparation of Polybenzimidazole Carboxylic Acid

The polybenzimidazole ester produced by the prior process can be converted to a polybenzimidazole carboxylic acid by hydrolyzing the polybenzimidazole ester in the presence of an hydroxyl base. Although the carboxylic acid is obtained as a salt, it is easily liberated from the salt by the addition of an acid. Using the polybenzimidazole esters as previously defined, the reaction sequence is as follows:

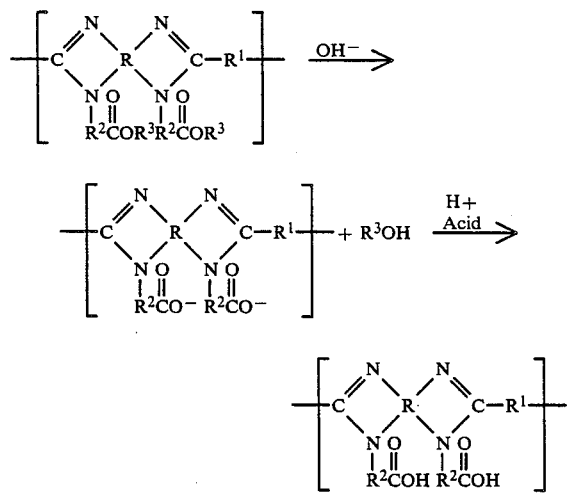

wherein R, $R^1$, $R^2$ and $R^3$ are as previously defined, wherein the strong hydroxyl base is either a strong inorganic hydroxyl base, with a pka of at least about 15, such as an alkali metal hydroxide, such as sodium hydroxide or potassium hydroxide or a strong organic hydroxyl base including alkoxides, such as sodium methoxide, and quarternary ammonium hydroxides, such as trimethyl ammonium hydroxide, trimethyl-n-propylammonium hydroxide, benzyl trimethyl ammonium hydroxide, dimethylethyl-n-propylammonium hydroxide; and the acid is any acid of sufficient strength to neutralize the base, such as hydrochloric acid, sulfuric acid or nitric acid, with hydrochloric and sulfuric acid the preferred acid. In a preferred embodiment, the hydroxyl base is organic and should be miscible in the solvent chosen for the reaction. In a more preferred embodiment, the organic hydroxyl bases includes trimethylammonium hydroxide or sodium methoxide.

Although the hydroxyl base can be employed essentially in any molar quantity with respect to the polybenzimidazole ester depending on the degree of substitution sought, preferably, at least a stoichiometric quantity of the hydroxyl ion should be present with respect to each substituted ester group on the polybenzimidazole polymer. In a preferred embodiment, the hydroxyl ions are present in quantities at least about 25 percent to about 100 percent greater than a stoichiometric quantity of the ester groups on the polybenzimidazole polymer.

To produce polybenzimidazole carboxylic acid, the polybenzimidazole ester produced from the prior procedure is dissolved in an organic solvent prior to the hydrolysis reaction. Among the suitable solvent are those normally used for dissolving polybenzimidazole such as N,N-dimethylformamide N-N-dimethylacetamide, dimethylsulfoxide, and N-methyl-2-pyrrolidone, with N-methyl-2-pyrrolidone the preferred solvent.

The concentration of the esterified polybenzimidazole polymer reactant in the organic solvent medium is limited only by the solubility of the esterified polybenzimidazole polymer in the solvent. Generally, the concentration of the esterified polybenzimidazole polymer should be in the range from about 1 to about 30 percent by weight, based on the total weight of the solution, with a preferred concentration of about 15 to about 25 percent, by weight.

The polybenzimidazole ester solvent solution may be prepared merely by mixing the polybenzimidazole ester with the solvent and stirring until all or substantially all of the ester is dissolved. A minor amount of heating at a temperature of about 25° C. to about 75° C. for about 5 to about 45 minutes may be useful to speed up the dissolution process. After dissolution, the solution may be filtered to remove any undissolved polybenzimidazole ester. A minimum amount, i.e., about 0.5 to about 5 percent by weight based on the weight of the esterification polybenzimidazole polymer, of lithium chloride may be added to the solution to prevent phase separation of the esterified polybenzimidazole polymer.

Once the polybenzimidazole ester solution is prepared, the hydroxyl base may be added by any conventional method, such as by addition funnel or by simply combining them in the reaction container. The reactants are then stirred at approximately room temperature or at a slightly elevated temperature, i.e., about 35° C. to about 60° C., for a period of about 1 minute to about 30 minutes.

The polybenzimidazole ester is rapidly converted into a polybenzimidazole carboxylic acid salt by the hydrolysis reaction. The polybenzimidazole carboxylic acid salt can be recovered or it can be converted into the polybenzimidazole carboxylic acid by neutralizing the base by the addition of an acid.

After the neutralization reaction is complete, the polybenzimidazole carboxylic acid can be recovered from the reaction vessel by filtration. The precipitate is then washed with a non-solvent for the carboxylic acid, such as water or acetone, to remove any remaining solvent and is then air dried. Upon analysis by conventional methods, such as infrared or nuclear magnetic spectroscopy, it has been surprisingly discovered that the hydrolysis reaction results in conversion of at least about 20 percent and, preferably, at least about 80 percent of the available ester groups on the polybenzimidazole polymer to polybenzimidazole carboxylic acid.

The polybenzimidazole carboxylic acid produced by the reaction of this process has a general formula:

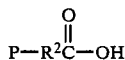

wherein P is the residuum of a polybenzimidazole polymer and $R^2$ is as previously defined.

These carboxylic acid derivatives produced by this process have use a separatory media, such as for ultrafiltration or reverse osmosis, and may be of particular use as a weak cation exchange resin.

The following examples are given as specific illustrations of the invention. All parts and percentages are by weight unless otherwise stated. It should be understood, however, that the invention is not limited to the specific details set forth in the examples.

EXAMPLES

Example 1

10 grams (0.03247 moles) of poly-2,2'-(m-phenylene)-5,5'-bibenzimidazole with an inherent viscosity of 0.73 dl/g at 30° C. were dissolved in 80 grams (0.799 moles) of N-methyl-2-pyrrolidone heated in a 500 milliliter round-bottom flask oil bath to a temperature of 60° C. 9.9 grams (0.0649 moles) of methyl bromoacetate, dissolved in 10 gram of N-methyl-2-pyrrolidone (0.099 moles) and placed in an addition funnel, were gradually added to the polybenzimidazole solution. The reaction was allowed to run for 4 hours at 60° C. After the reaction solution cooled to room temperature, 30 grams of acetone were added which resulted in the precipitation of 11 grams of N-methylcarbomethoxy polybenzimidazole. An infrared spectroscopy analysis of the precipitate showed ester substitution on 10 percent of the available imidazole nitrogen sites on the polybenzimidazole polymer.

Example 2

The reaction run in Example 1 was repeated using 13 grams (0.04232 moles) of poly-2,2'-(m-phenylene)-5,5''-bibenzimidazole, 2.1 grams (0.049 moles) of lithium chloride, 247 grams (2.46 moles) of N-methyl-2-pyrrolidone and 20.8 grams of a 60 percent methyl bromoacetate solution, comprised of 12.5 grams methyl bromoacetate and 8.3 grams of N-methyl-2-pyrrolidone. The reactants were mixed in a 800 ml round bottom reaction flask and heated at 65° C. for 24 hours. 50 grams of water were added to the solution to precipitate out the N-methylcarbomethoxy polybenzimidazole. After oven drying for 3 hours at 110° C., the reaction yielded 23 grams of the N-methylcarbomethoxy polybenzimidazole. A nuclear magnetic resonance spectroscopy analysis of the precipitate showed ester substitution of 83.3 percent of the available imidazole nitrogen sites on the polybenzimidazole polymer.

Example 3

To a 500 milliliter reaction flask containing 2.5 grams (0.00812 moles) of an 83.3 percent substituted N-methylcarbomethoxy polybenzimidazole produced from Example II dissolved in 47.5 grams (0.0474 moles) of N-methyl-2-pyrrolidone were added dropwise, by an addition funnel, 2.7 grams (0.0162 moles) of a 98 percent concentrated solution of benzyl trimethyl ammonium hydroxide. Precipitation within the reaction flask began within about 1 minute. After complete addition of the hydroxide, 3.5 grams of the N-methyl polybenzimidazole carboxylic acid salt precipitated from the solution. 0.3 grams of hydrochloric acid were added to neutralize the base and produce 2.2 grams of N-methyl polybenzimidazole carboxylic acid which was recovered by filtration. The precipitate was air dried for 5 hours at 110° C. A nuclear magnetic resonance spectroscopy of the precipitate showed 98 percent of the available ester groups on the N-methylcarbomethoxy polybenzimidazole starting material were substituted with carboxylic acid substituents.

As is apparent from these examples, substituted polybenzimidazole carboxylic acids and esters can be prepared by the process of the instant invention from unsubstituted polybenzimidazole polymers. These acids and esters can be quite useful as separatory media and, in particular for the carboxylic acids, for use as weak ion exchange resins.

What is claimed:

1. A process for preparing a polybenzimidazole carboxylic ester comprising of the steps of:
   (a) preparing polybenzimidazole polymer solvent solution; and
   (b) reacting the polybenzimidazole polymer with an halogenated alkyl ester to form an N-substituted polybenzimidazole carboxylic ester.

2. A process for preparing a polybenzimidazole carboxylic acid comprising the steps of:
   (a) preparing a polybenzimidazole polymer solvent solution;
   (b) reacting the polybenzimidazole polymer with an halogenated alkyl ester to form an N-substituted polybenzimidazole carboxylic ester; and
   (c) hydrolyzing the polybenzimidazole ester in the presence of an hydroxyl base to form an N-substituted polybenzimidazole carboxylic acid.

3. The process as in any of claims 1 or 2 wherein the halogenated ester has a general formula of:

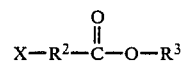

wherein X is a halogen selected from the group consisting of chloro, bromo or iodo; $R^2$ is a $C_1$ to $C_{20}$ alkyl substituent; and $R^3$ is a substituted or unsubstituted, monovalent $C_1$ to $C_{20}$ alkyl, alkenyl or aryl substituent, wherein $R^2$ and $R^3$ are the same or different.

4. The process of claim 3 wherein the halogen is bromo.

5. The process of claim 3 wherein $R^2$ is a $C_1$ to $C_6$ unsubstituted alkyl substituent.

6. The process as in any of claims 1 or 2 wherein the halogenated ester is a halogenated $C_1$ to $C_6$ alkyl acetate.

7. The process as in any of claims 1 or 2 wherein the halogenated ester is methyl bromoacetate.

8. The process as in any of claims 1 or 2 wherein the N-substituted polybenzimidazole ester has a general formula of:

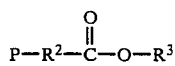

wherein P is a polybenzimidazole polymer residuum; $R^2$ is a substituted or unsubstituted $C_1$ to $C_{20}$ alkyl substituent and $R^3$ is a monovalent $C_1$ to $C_{20}$ alkyl alkenyl, or aryl substituent, wherein $R^2$ and $R^3$ are the same as or different from each other.

9. The process of claim 8 wherein $R^2$ is a $C_1$ to $C_6$ alkyl group, and $R^3$ is a monovalent, substituted or unsubstituted $C_1$ to $C_{20}$ alkyl, alkenyl or aryl substituent.

10. The process as in any of claims 1 or 2 wherein the N-substituted polybenzimidazole ester is N-methylcarbomethoxy polybenzimidazole ester.

11. The process of claim 2 wherein the hydroxyl base has a pka of at least about 15.

12. The process of claim 2 wherein the hydroxyl base is selected from the group consisting of alkoxides and quaternary ammonium hydroxides.

13. The process of claim 12 wherein the hydroxyl base is benzyl trimethyl ammonium hydroxide.

14. The process of claim 2 wherein the polybenzimidazole carboxylic acid has a general formula of:

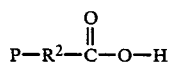

wherein P is a polybenzimidazole polymer residuum and $R^2$ is a substituted or unsubstituted $C_1$ to $C_{20}$ alkyl substituent.

15. The process of claim 14 wherein $R^2$ is a $C_1$ to $C_6$ alkyl group.

16. The process as in any of claims 1 or 2 wherein the polybenzimidazole polymer starting material is characterized by recurring monomeric units of:

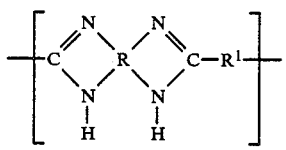

wherein R is a tetravalent aromatic nucleus, with the nitrogen atoms forming the benzimidazole rings being paired upon adjacent carbon atoms, of the aromatic nucleus, and $R^1$ is a number of the class consisting of (1) an aromatic ring, (2) an alkylene group and (3) a heterocyclic ring from the class consisting of (a) pyridine, (b) pyrazine, (c) furan, (d) quinoline, (e) thiophene, and (f) pyran.

17. The process as in any of claims 1 or 2 wherein the polybenzimidazole polymer starting material is comprised of recurring monomeric units of:

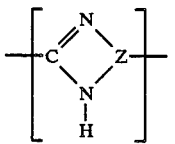

wherein Z is an aromatic nucleus having the nitrogen atoms forming the benzimidazole ring paired upon adjacent carbon atoms of the aromatic nucleus.

18. The process as in any of claims 1 or 2 wherein the polybenzimidazole polymer starting material is poly-2,2'-(m-phenylene)-5,5-'bibenzimidazole.

19. The process as in any of claims 1 or 2 wherein the concentration of the polybenzimidazole polymer in the solvent solution is in the range of about 5 to about 15 percent, by weight based on the total solution weight.

20. The process as in any of claims 1 or 2 wherein the concentration of the polybenzimidazole polymer in the solvent solution is in the range of about 5 to about 10 percent by weight based on the total solution weight.

21. The process as in any of claims 1 or 2 wherein the solvent in the polybenzimidazole polymer solvent solution is selected from the group consisting of N-N-dimethylacetamide, N-N-dimethylformamide, dimethylsulfoxide and N-methyl-2-pyrrolidone.

22. The process as in any of claims 1 or 2 wherein the solvent in the polybenzimidazole polymer solvent solution is N-methyl-2-pyrrolidone.

23. The process as in any of claims 1 or 2 wherein the ratio of the halogenated ester groups to the available imidazole hydrogen sites on the polybenzimidazole polymer is about stoichiometric.

24. The process as in any of claims 1 or 2 wherein the reaction between the halogenated ester and the polybenzimidazole polymer is conducted at a temperature between about 30° and about 180° for a period of about 1 to about 24 hours.

25. The process as in any of claims 1 or 2 wherein the reaction between the halogenated ester and the polybenzimidazole polymer is conducted at a temperature between about 60° C. and about 120° C. for a priod of about 5 to about 15 hours.

26. The process as in any of claims 1 or 2 wherein at least about 10 percent of the reactive imidazole hydrogen sites on the polybenzimidazole polymer are substituted with ester substituents.

27. The process of claim 2 wherein the polybenzimidazole ester is hydrolyzed in the presence of at least a stoichiometric quantity of an hydroxyl base.

28. The process of claim 2 wherein at least about 20 percent of the polybenzimidazole polymer ester sites are hydrolyzed to form N-substituted polybenzimidazole carboxylic acid.

29. A process for preparing polybenzimidazole carboxylic esters comprising the steps of:
(a) preparing about a 5 to about a 10 percent by weight, based on the total solution weight, of an polybenzimidazole polymer solvent solution wherein the staring material is characterized by recurring monomeric units of:

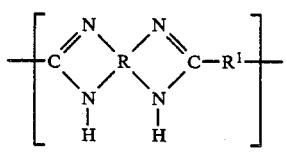

wherein R is a tetravalent aromatic nucleus with the nitrogen atoms forming the benzimidazole rings being paired upon adjacent carbon atoms, of the aromatic nucleus, and $R^1$ is a member of the class consisting of (1) an aromatic ring, (2) an alkylene group, and (3) a heterocyclic ring from the class consisting of (a) pyridine, (b) pyrazine, (c)

furan, (d) quinoline, (e) thiophene, and (f) pyran; and (b) reacting the polybenzimidazole polymer solvent solution with approximately a stoichiometric quantity of an halogenated ester having the general formula of:

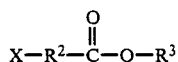

wherein X is a halogen, selected from the group consisting of chloro, bromo or iodo; $R^2$ is a $C_1$ to $C_6$ alkyl group, and $R^3$ is a monovalent, substituted or unsubstituted $C_1$ to $C_{20}$ alkyl, alkenyl or aryl substituent wherein $R^2$ and $R^3$ are the same as or different from each other, to form an N-substituted polybenzimidazole carboxylic ester.

30. A process for preparing a polybenzimidazole carboxylic acid comprising the steps of:
(a) preparing about a 5 to about a 10 percent by weight based on the total solution weight solvent solution of poly-2,2'-(m-phenylene)-5,5'-benzimidazole polymer dissolved in N-methyl-2-pyrrolidone; and
(b) reacting the poly-2,2'(m-phenylene)-5,5'-bibenzimidazole polymer with about a stoichiometric quantity of methyl bromoacetate to form N-methylcarbomethoxy polybenzimidazole ester.

31. A process for preparing polybenzimidazole carboxylic acids comprising the steps of:
(a) preparing about 5 to about 10 percent by weight, based on the total solution weight, of a polybenzimidazole polymer solvent solution wherein the starting material is characterized by recurring monomeric units of:

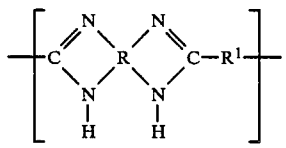

wherein R is a tetravalent aromatic nucleus with the nitrogen atoms forming the benzimidazole rings being paired upon adjacent carbon atoms, of the aromatic nucleus, and $R^1$ is a member of the class consisting of (1) an aromatic ring, (2) an alkylene group, and (3) a heterocyclic ring from the class consisting of (a) pyridine, (b) pyrazine, (c) furan, (d) quinoline, (e) thiophene, and (f) pyran; and (b) reacting the polybenzimidazole polymer with about a stoichiometric quantity of a halogenated ester having the general formula:

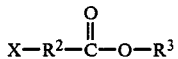

wherein X is a halogen selected from the group consisting of chloro, bromo or iodo; $R^2$ is a $C^1$ to $C^6$ alkyl group and $R^3$ is a monovalent, substituted or unsubstituted $C_1$ to $C_{20}$ alkyl, alkenyl or aryl substituent wherein $R^2$ and $R^3$ are the same as or different from each other, to form an N-substituted polybenzimidazole ester; and (c) hydrolyzing the N-substituted polybenzimidazole ester in the presence of at least a stoichiometric quantity of an organic hydroxyl base with a pka of at least about 15 to form a polybenzimidazole carboxylic acid.

32. A process for preparing a polybenzimidazole carboxylic acid comprising the steps of:
(a) preparing about a 5 to about a 10 percent by weight, based on the total weight of a solvent solution, of poly-2,2'(m-phenylene)-5,5'-benzimidazole polymer dissolved in N-methyl-2-pyrrolidone;
(b) reacting the poly-2,2'-(m-phenylene)-5,5'-bibenzimidazole polymer with about a stoichiometric quantity of methyl bromoacetate to form N-methylcarbomethoxy polybenzimidazole ester; and
(c) hydrolyzing the N-methylcarbomethoxy polybenzimidazole ester in the presence of at least a stoichiometric quantity of an organic hydroxyl base with a pka of at least about 15, to form N-methyl polybenzimidazole carboxylic acid.

33. A polymer having at least one unit of the general formula:

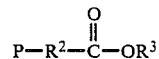

wherein $R^2$ is a $C_1$-$C_{20}$ alkyl substituent, $R^3$ is a monovalent, $C_1$-$C_{20}$ substituted or unsubstituted alkyl, alkenyl or aryl substituent, and P is the residuum of a polybenzimidazole polymer wherein $R^2$ is directly attached to a nitrogen of the benzimidazole ring.

34. The polymer of claim 33 wherein $R^2$ is a $C_1$-$C_6$ alkyl substituent.

35. The polymer of claim 33 wherein $R^2$ is a methyl group.

36. A polymer having at least one unit of the general formula:

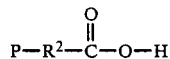

wherein $R^2$ is a $C^1$-$C^{20}$ alkyl substituent and P is the residuum of a polybenzimidazole polymer wherein R is directly attached to a nitrogen of the benzimidazole ring.

37. The polymer of claim 36 wherein $R^2$ is a $C^1$-$C^6$ alkyl substituent.

38. The polymer of claim 36 wherein $R^2$ is a methyl group.

39. The polybenzimidazole carboxylic acid produced by the process of claim 2.

40. The polybenzimidazole carboxylic ester produced by the process of claim 29.

41. The N-methyl carbomethoxy polybenzimidazole ester produced by the process of claim 30.

42. The polybenzimidazole carboxylic ester produced by the process of claim 31.

43. The N-methyl polybenzimidazole carboxylic acid produced by the process of claim 32.

44. The process as any of claims 29 or 31 wherein the solvent in the polybenzimidazole polymer solvent solution is N-methyl-2-pyrolidone.

45. The process as in any of claims 31 or 32 wherein the hydroxyl base is selected from the group consisting of alkoxides and quaternary ammonium hydroxides.

46. The process as in any of claims 29, 30, 31 or 32 wherein the reaction between the halogenated ester and the polybenzimidazole polymer is conducted at a temperature between about 60° C. and about 120° C. for a period of about 5 to about 15 hours.

47. The process as in any of claims 29, 30, 31 or 32 wherein at least about 10 percent of the reactive imidazole hydrogen sites on the polybenzimidazole polymer are substituted with ester substituents.

48. The process as in any of claim 31 or 32 wherein at least about 20 percent of the polybenzimidazole polymer ester sites are hydrolyzed to form N-substituted polybenzimidazole carboxylic acid.

* * * * *